(12) United States Patent
Wu (10) Patent No.: US 9,677,927 B2
(45) Date of Patent: Jun. 13, 2017

(54) MAGNETOSTRICTIVE TRANSMITTER PIEZOELECTRIC PICKUP SENSOR

(71) Applicant: Orion Instruments, LLC, Baton Rouge, LA (US)

(72) Inventor: Yuansun Wu, Baton Rouge, LA (US)

(73) Assignee: Orion Instruments, LLC, Baton Rouge, LA (US)

( * ) Notice: Subject to any disclaimer, the term of this patent is extended or adjusted under 35 U.S.C. 154(b) by 365 days.

(21) Appl. No.: 14/338,393

(22) Filed: Jul. 23, 2014

(65) Prior Publication Data

US 2016/0025547 A1 Jan. 28, 2016

(51) Int. Cl.
*G01B 7/14* (2006.01)
*G01B 7/30* (2006.01)
*G01F 23/72* (2006.01)
*G01F 23/296* (2006.01)

(52) U.S. Cl.
CPC ............. *G01F 23/72* (2013.01); *G01B 7/14* (2013.01); *G01B 7/30* (2013.01); *G01F 23/2963* (2013.01)

(58) Field of Classification Search
CPC ..... G01F 23/2963; G01F 23/72; G01B 7/003; G01B 7/30; G01B 7/14
USPC .................................................... 324/207.13
See application file for complete search history.

(56) References Cited

U.S. PATENT DOCUMENTS

| | | | | |
|---|---|---|---|---|
| 3,987,320 A | * | 10/1976 | Merhar | B06B 1/0637 310/339 |
| 4,943,773 A | * | 7/1990 | Koski | G01B 7/003 324/207.13 |
| 5,473,245 A | * | 12/1995 | Silvus, Jr. | G01B 7/02 310/333 |
| 6,062,905 A | * | 5/2000 | Sampa | E21B 17/028 439/587 |
| 7,466,124 B2 | * | 12/2008 | Janitch | G01F 23/2963 324/207.13 |

* cited by examiner

*Primary Examiner* — Reena Aurora
(74) *Attorney, Agent, or Firm* — Wood, Phillips, Katz, Clark & Mortimer (57) ABSTRACT

A pickup sensor is disclosed for a magnetostrictive sensing instrument for sensing position of a magnetic field. The instrument includes an elongate tube having a near end and a distal end. A magnetostrictive wire in the tube has first and second ends. The second end is operatively secured at the tube distal end. The pickup sensor comprises a housing mounted proximate the tube near end. A pair of crystals are in the housing sandwiching the magnetostrictive wire so that interaction between an electric pulse on the magnetostrictive wire and a magnetic field produces a torsional wave on the magnetostrictive wire sensed by the pair of crystals. A pair of spring elements are mounted in the housing sandwiching the crystals to provide consistent contact force between the crystals and the magnetostrictive wire.

19 Claims, 6 Drawing Sheets

MAGNETOSTRICTIVE TRANSMITTER PIEZOELECTRIC PICKUP SENSOR

CROSS-REFERENCE TO RELATED APPLICATIONS

Not applicable.

FEDERALLY SPONSORED RESEARCH OR DEVELOPMENT

Not applicable.

MICROFICHE/COPYRIGHT REFERENCE

Not applicable.

FIELD OF THE INVENTION

This invention relates to process control instruments, and more particularly, to a magnetostrictive transmitter piezoelectric pickup sensor.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to or representing sensed level.

Knowledge of level in industrial process tanks or vessels has long been required for safe and cost-effective operation of plants. Many technologies exist for making level measurements. These include magnetostrictive, capacitance, ultrasonic and microwave radar, to name a few.

One form of process instrument is of the intrusive type in which the primary element is in direct contact with the process fluid for sensing level. A magnetostrictive transmitter is an example of an intrusive type level measurement instrument. A magnetostrictive transmitter has a probe including a magnetostrictive wire maintained under tension in a tube. The probe extends into the process vessel. A magnetic float is movable proximate the probe and floats atop the fluid in the vessel. An electrical pulse is transmitted on the magnetostrictive wire. The electrical pulse interacts with the magnetic field of the float, which creates a torque on the wire to produce a torsional force on the wire, thus initiating a torsional wave that propagates along the wire at the speed of sound. This is known as the Wiedemann effect. Typically, a pickup sensor is positioned at one end of the wire to sense the torsional wave on the wire. The elapsed time is measured between the launch of the electrical pulse and the signal from the pickup sensor. The distance between the magnet and the pickup sensor is calculated from the measured elapsed time multiplied by the speed of the torsional wave, representing level.

Known magnetostrictive measurement instruments use piezoelectric crystals as a pickup sensor. A known pickup sensor uses a pair of crystals mounted proximate a near end of the tube. The crystals sandwich the magnetostrictive wire so that interaction between an electric pulse on the magnetostrictive wire and the magnetic field produces the torsional wave on the magnetostrictive wire sensed by the pair of crystals. The contact force between the piezoelectric crystals and the magnetostrictive wire is critical. Ample contact force is required to couple the energy of the torsion wave to the crystal. However, excessive contact force can break the crystals. Previous designs used screws to clamp the assembly together. Contact force was controlled by the amount of torque applied to the screws. Excessive torque could cause breakage of the crystals.

The present invention is directed to solving one or more of the problems discussed above in a novel and simple manner.

SUMMARY

As disclosed herein, a pickup sensor uses springs to produce a contact force.

Also as disclosed herein, a pickup sensor is assembled without the use of any threaded fasteners.

There is disclosed herein a pickup sensor for a magnetostrictive sensing instrument for sensing position of a magnetic field. The instrument includes an elongate tube having a near end and a distal end. A magnetostrictive wire in the tube has first and second ends. The second end is operatively secured at the tube distal end. The pickup sensor comprises a housing mounted proximate the tube near end. A pair of crystals are in the housing sandwiching the magnetostrictive wire so that interaction between an electric pulse on the magnetostrictive wire and a magnetic field produces a torsional wave on the magnetostrictive wire sensed by the pair of crystals. A pair of spring elements are mounted in the housing sandwiching the crystals to provide consistent contact force between the crystals and the magnetostrictive wire.

It is a feature that the spring elements comprise electrical contacts to electrically connect the crystals to a sensing circuit. The spring elements may each include a tab extending outwardly from the housing to connect to an electrical conductor.

The housing may comprise first and second trays for supporting the spring elements and the crystals and a retaining ring maintains the trays in assembled relationship.

It is a further feature that the first and second trays support the spring elements and the crystals and a removable resilient fastener selectively maintains the trays in assembled relationship. The spring elements and the crystals may maintain the magnetostrictive wire in compression.

It is another feature that the spring elements are adhesively secured to the crystals.

It is a further feature that the spring elements comprise electrical contacts to electrically connect the crystals to a sensing circuit and the spring elements are adhesively secured to the crystals using a conductive adhesive.

There is disclosed in accordance with another aspect a magnetostrictive level sensing instrument for sensing level of a process material comprising an elongate tube having a near end and a distal end. A magnet is selectively positionable proximate the tube responsive to level of the processed material. A magnetostrictive wire in the tube has first and second ends. The second end is operatively secured at the tube distal end. A pickup sensor comprises a housing mounted proximate the tube near end. A pair of crystals are in the housing sandwiching the magnetostrictive wire so that interaction between an electric pulse on the magnetostrictive wire and a magnetic field produces a torsional wave on the magnetostrictive wire sensed by the pair of crystals. A pair of contact blade springs is mounted in the housing sandwiching the crystals to provide consistent contact force between the crystals and the magnetostrictive wire to electrically connect the crystals to a sensing circuit.

There is disclosed in accordance with another aspect a magnetostrictive level sensing instrument for sensing the level of a process material comprising an elongate tube having a near end and a distal end. A magnet is selectively positionable proximate the tube responsive to level of the process material. A magnetostrictive wire in the tube has first and second ends. The second end is operatively secured at the tube distal end. A pickup sensor is mounted proximate the tube near end and comprises first and second trays each supporting a respective first and second spring element and a first and second crystal. The first and second crystals sandwich the magnetostrictive wire so that interaction between an electric pulse on the magnetostrictive wire and a magnetic field produces a torsional wave on the magnetostrictive wire sensed by the crystals. The spring elements sandwich the crystals to provide consistent contact force between the crystals and the magnetostrictive wire. Removable resilient fasteners support the trays and maintain the pickup sensor in assembled relationship devoid of any threaded fasteners.

Other features and advantages will be apparent from a review of the entire specification, including the appended claims and drawings.

DETAILED DESCRIPTION

Figure 1:
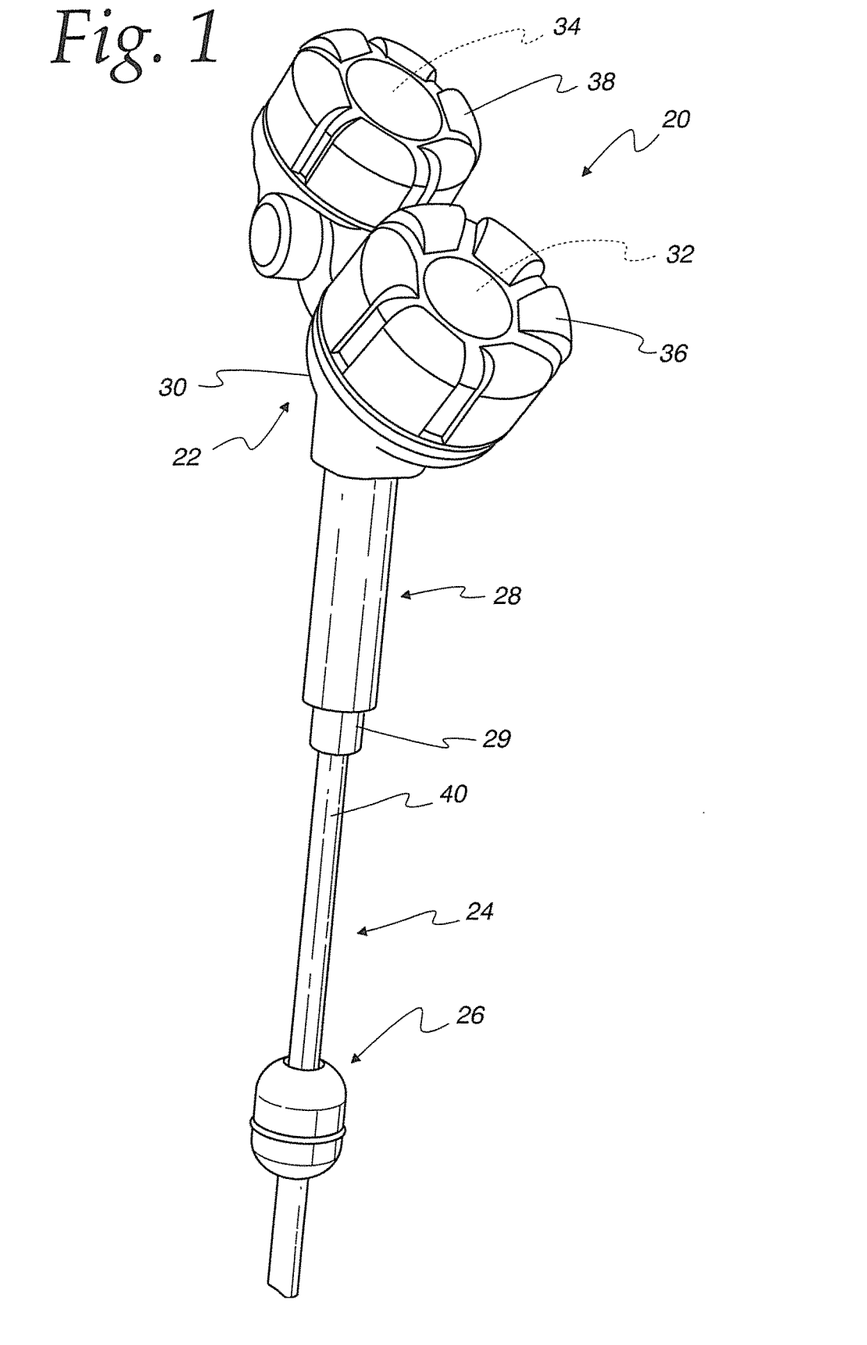
FIG. 1 is a perspective view of a magnetostrictive transmitter with an improved piezoelectric pickup sensor.

Referring to FIG. 1, a magnetostrictive level sensing instrument in the form of a transmitter 20 is illustrated. As is conventional, the transmitter 20 is operable to sense level of a material, such as a fluid in a process vessel, and transmit an electrical signal indicative of the level to control instrumentation.

The transmitter 20 includes a control housing 22, a probe 24, a float 26, a connector 28, and an adapter 29. The adapter 29 connects the probe 24 to the connector 28 and is used for connecting the probe 24 to an opening in a process vessel (not shown). Alternatively, a flange may be used, as is known. The connector 28 connects the probe 24 to the housing 22. The housing 22 comprises a dual compartment instrument housing as described in Mulrooney et al. U.S. Pat. No. 6,062,905. The housing 22 includes a base assembly 30 to define an electronics compartment 32 and a wiring compartment 34. The compartments 32 and 34 are selectively closed by respective covers 36 and 38. The electronics compartment 32 houses a sensing circuit, described below, for determining level and generating an electrical signal representing level for transmission to other control instruments, as is well known.

The float 26 comprises a conventional magnetic float, including internal magnets M, captured on the probe 24. As is known, the float 26 floats atop the material the level of which is being sensed and creates a magnetic field representative of the location of the top surface of the fluid or other material. As is apparent, the float 26 could be replaced by another type of magnetic device for more generally sensing position of the magnet. Thus, the sensing instrument 20 could alternatively sense position rather than just level.

Figure 2:
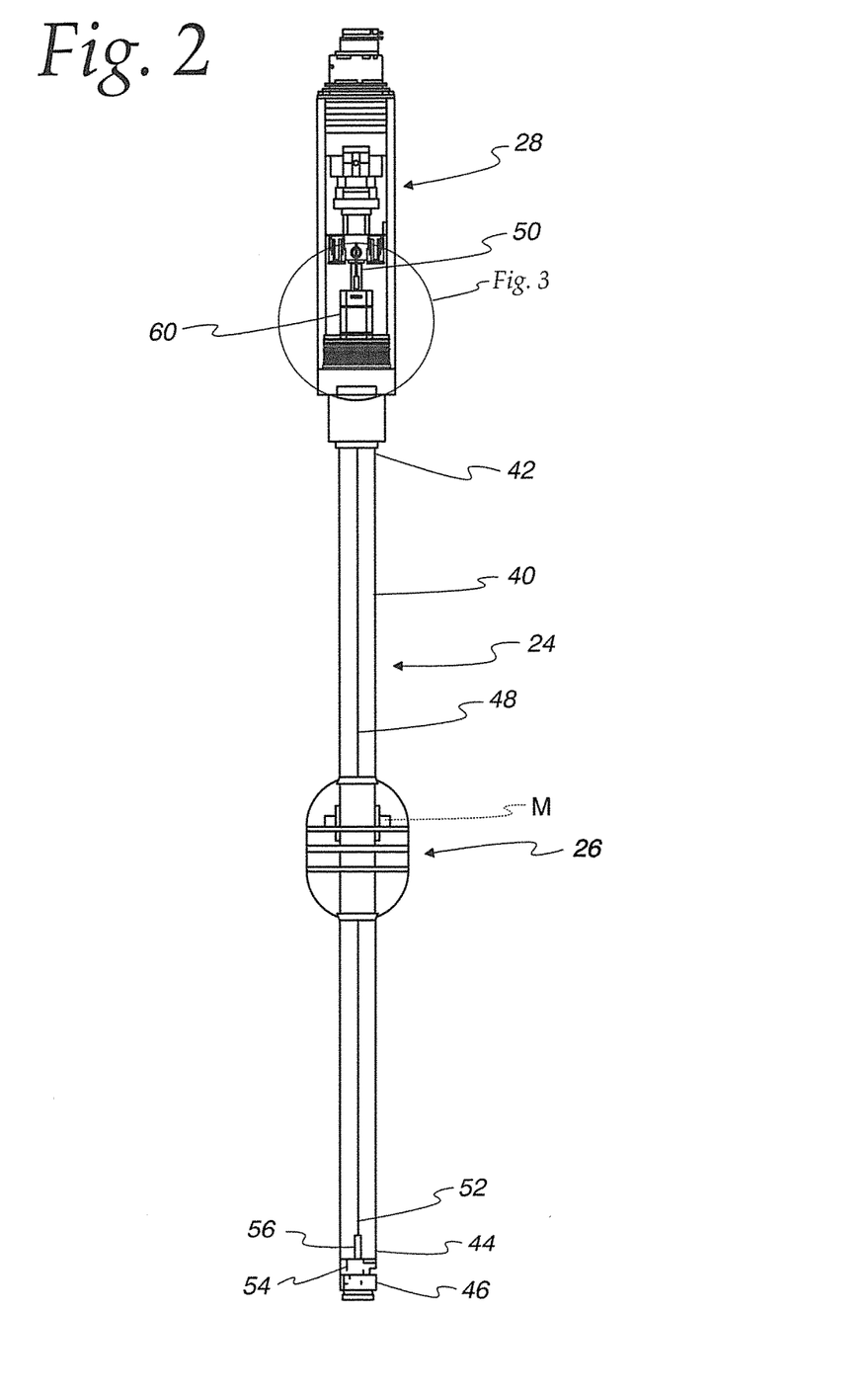
FIG. 2 is a partial sectional view of a probe for the transmitter of FIG. 1 illustrating the pickup sensor.
Figure 3:
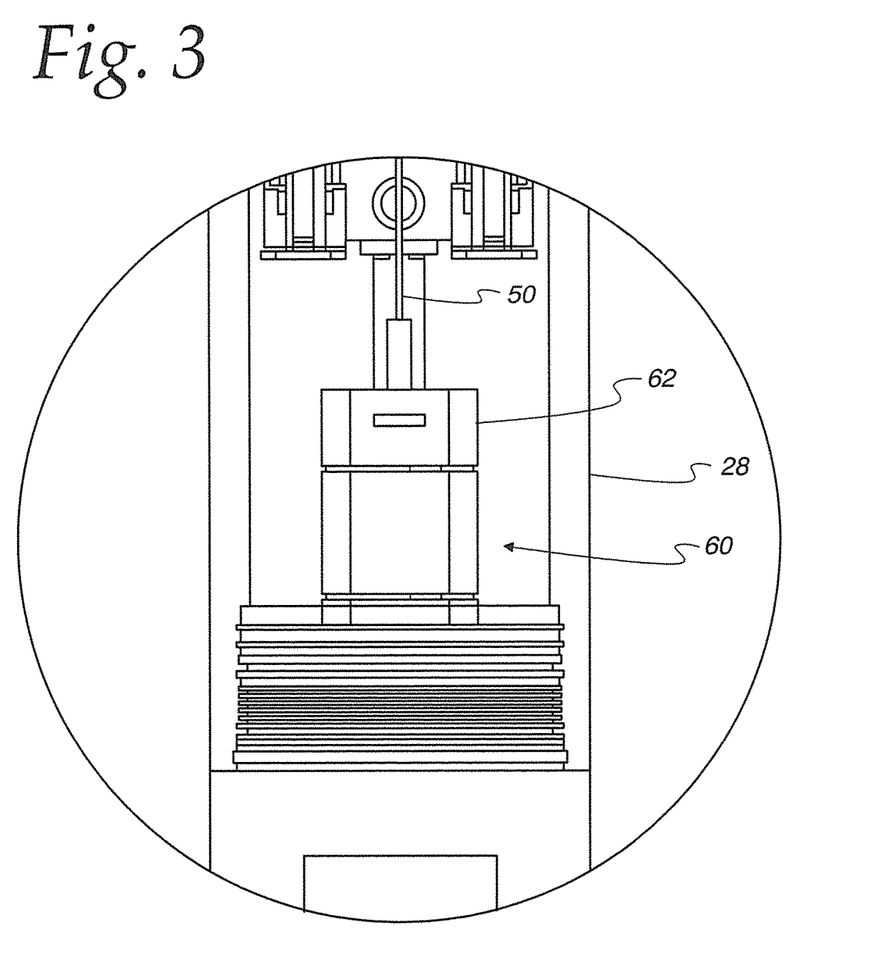
FIG. 3 is an enlarged view of the top of the probe and the pickup sensor taken from FIG. 2.
Figure 7:
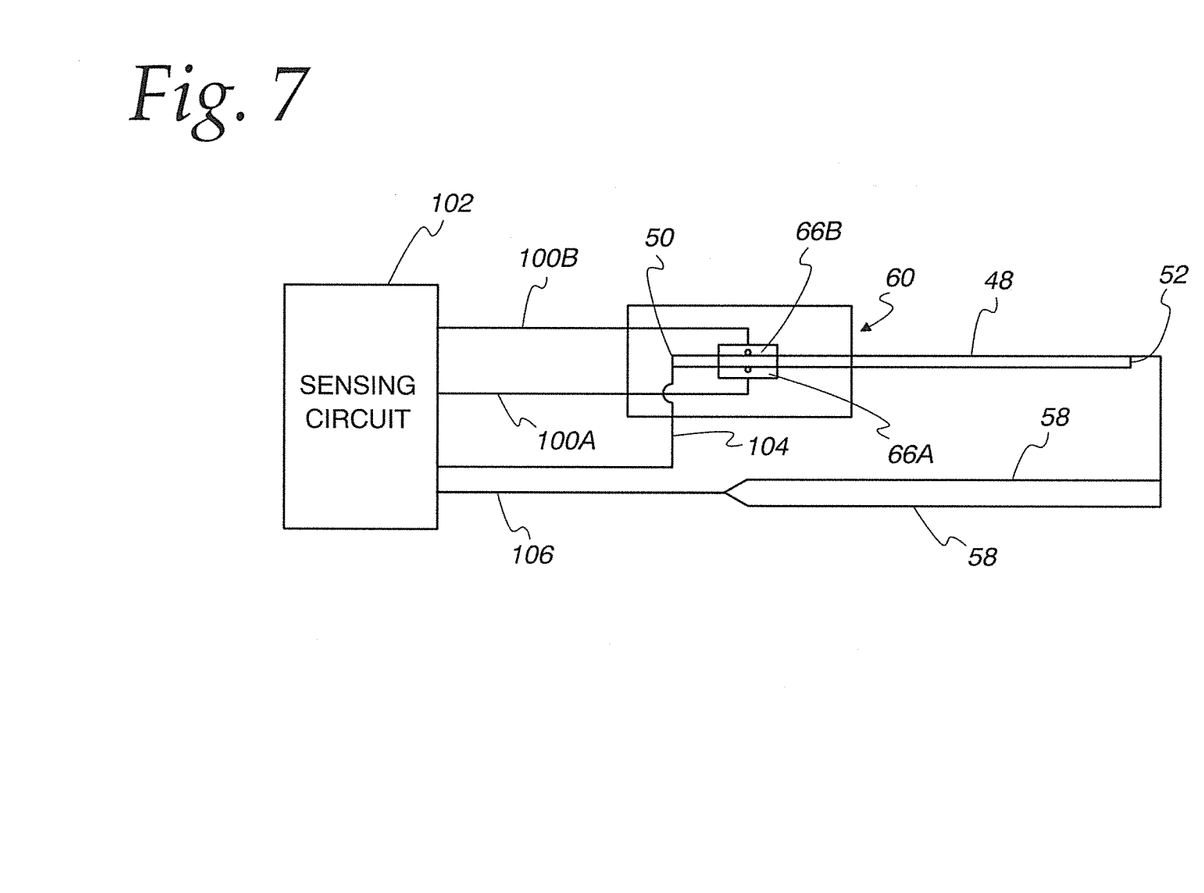
FIG. 7 is a schematic representation of a circuit for the transmitter.

Referring to FIG. 2, the probe 24, shown partially in section, comprises an elongate stainless steel tube 40 having a near end 42 and a distal end 44. The distal end 44 is closed by an end cap 46. A magnetostrictive wire 48 has a first end 50 and a second end 52. The wire second end 52 is secured to a wire end fixture 54 located proximate the tube distal end 44. Sensor return wires 58, see FIG. 7, are connected to the magnetostrictive wire 48 proximate its second end 52 to provide a signal return. Although not shown, spacers may be used to maintain proper spaced relationship between the magnetostrictive wire 48, the return wires 58 and the tube 40. A pickup sensor 60 is mounted in the connector 28 proximate the tube near end 42 and receives the magnetostrictive wire near end 50. The pickup sensor 60 may be used with numerous different probe designs and sensing circuits, which are described herein by way of illustration and are not intended to be limiting.

Referring to FIGS. 3-6, the pickup sensor 60 comprises a housing 62 formed from first and second molded plastic trays 64A and 64B. The trays 64A and 64B are of identical construction and are configured to interlock with one another to form the housing 62. The trays 64A and 64B are referenced in the drawings with like reference numerals with suffixes A and B. For simplicity, only the first tray 64A is described in detail, it being understood that the second tray 64B includes corresponding elements. The trays 64A and 64B support respective first and second crystals 66A and 66B and first and second spring elements 68A and 68B.

Figure 5:
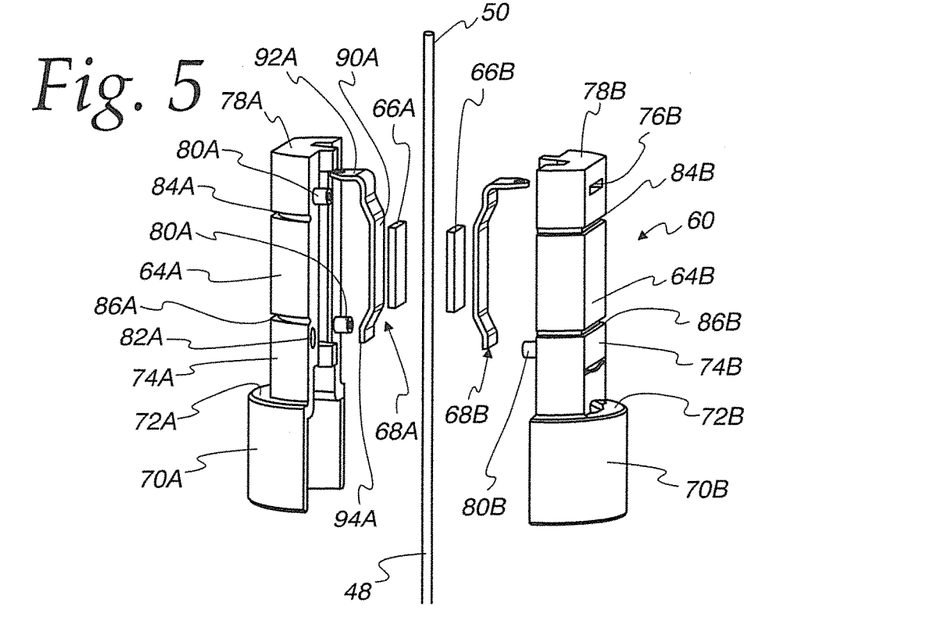
FIG. 5 is an exploded view of the pickup sensor.

The first tray 64A comprises a semi-cylindrical body 70A connected via a shoulder 72A to an elongate neck 74A. The elongate neck 74A includes a slot 76A proximate a top end 78A. The neck 74A includes inwardly directed protrusions 80A and opposite openings 82A only one of which is shown. The neck 74A includes an upper annular groove 84A and a lower annular groove 86A. When the trays 64A and 64B are brought together, the first tray protrusions 80A are received in the second tray openings 82B and likewise the second tray protrusions 80B are received in the first tray openings 82A to provide proper alignment.

Figure 4:
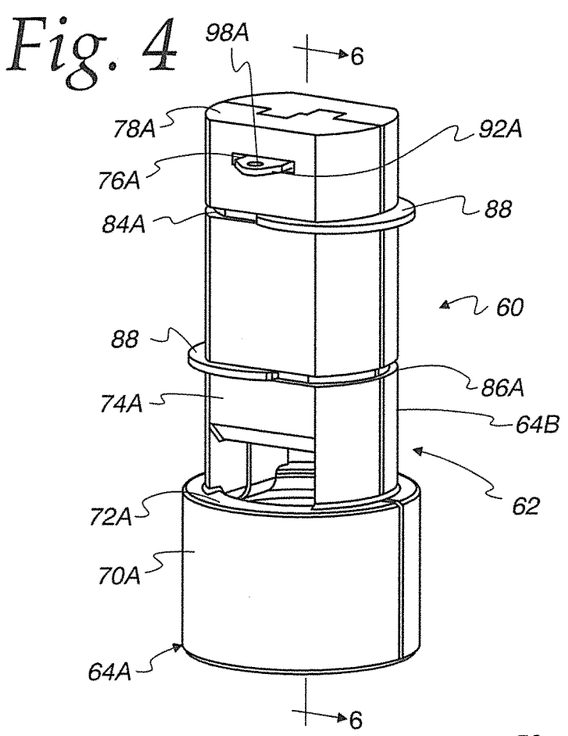
FIG. 4 is a perspective view of the pickup sensor.

The trays 64A and 64B are interlocked to form the housing 60, as shown in FIG. 4. Resilient retaining rings 88 are used to hold the trays 64A and 64B together. Particularly, one retaining ring 88 is received in the annular grooves 84A and 86A while the other retaining ring 88 is received in the annular grooves 86A and 86B. The retaining rings 88 can be mounted on opposite sides, as shown. As such, the housing 60 is held together without the use of any threaded fasteners.

The crystals 66A and 66B may be of parallelepiped shape. The crystals 66A and 66B are advantageously polarized in the thickness shear mode, referred to as the K15 coupling direction, as described in U.S. Pat. No. 7,466,124, the specification of which is incorporated by reference herein.

The first spring element 68A comprises a contact blade spring formed by bending a unitary elongate strip of a conductive material. The first spring element 68A has an elongate planar central contact portion 90A between opposite offset bends 91A and 93A and turned outwardly from the uppermost offset bend 91A to define an upper tab 92A and includes an opposite lower end 94A. The offset bends 91A and 93A are seated on an inner wall 96A of the neck 74A. This spaces the central contact portion 90A from the inner wall 96A, as shown. The tab 92A extends outwardly through the slot 76A, see FIG. 4, and includes an aperture 98A for receiving an electrical conductor 100A, see FIG. 7. The planar central contact portion 90A supports the crystal 66A which may be adhered thereto with a conductive adhesive, such as silver epoxy, or a conductive tape, or the like. Owing to flexibility of the spring element 68A and its being mounted in the first tray 64A, the central contact portion 90A maintains a bias on the crystal 66A. The second spring element 68B is identical to the first spring element 68A.

Figure 6:
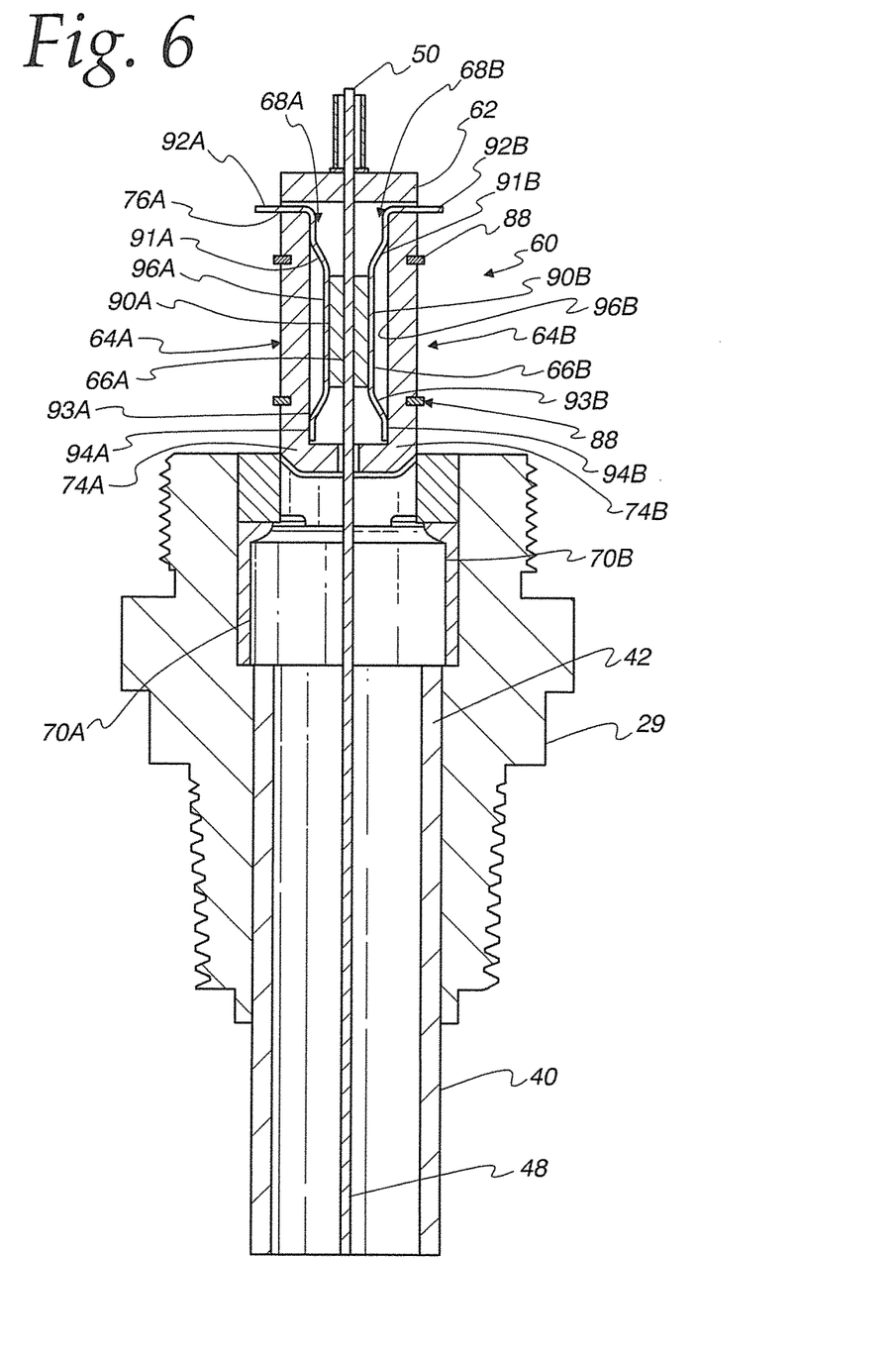
FIG. 6 is a sectional view of the pickup sensor.

As illustrated in FIG. 6, the spring elements 68A and 68B sandwich the crystals 66A and 66B which in turn sandwich the magnetostrictive wire 48. This assembly is held in place within the housing 62. The spring elements 68A and 68B provide a contact force between the crystals 66A and 66B and the magnetostrictive wire 48 and absorb dimensional variances of the parts to provide consistent contact force. Also, the spring element 68A and 68B function as electrical conductors to provide electrical connections between the crystals 66A and 66B and a sensing circuit 102, see FIG. 7. Particularly, electrical conductors 100A and 100B are connected such as by soldering to the tabs 92A and 92B and terminate at the sensing circuit 102. Additionally, conductors 104 and 106 provide connection between the sensing circuit 102 and the magnetostrictive wire 48 and the return wires 58, as shown.

As is conventional, the sensing circuit 102 develops an electrical pulse on the magnetostrictive wire 48 and a magnetic field from the float magnet M produces a torsional wave on the magnetostrictive wire 48 sensed by the pair of crystals 66A and 66B. This wave is used by the sensing circuit 102 to determine position of the magnet M, representing level when implemented as a level measuring instrument.

As described above, the housing 60 with the spring elements 68A and 68B and their respective crystals 66A and 66B sandwich the magnetostrictive wire 48, as shown in FIG. 6. The magnetostrictive wire 48 is conductive. Therefore, a conductive path exists from the first sensor wire 100A through the first crystal 66A, the magnetostrictive wire 48, the second crystal 66B, and the second sensor wire 100B. As such, the differential electrical response of the crystals is differentially amplified. This results in an efficient pickup sensor 60 with high signal amplitude and low noise. The pickup sensor 60 is not sensitive to vibration because the responses of the two crystals 66A and 66B to the shear components of any translational load cancel out. Otherwise, the operation of the pickup sensor 60 relative to the sensing circuit 90 is generally similar to that described in U.S. Pat. No. 7,466,124, incorporated by reference herein.

Thus, the use of the novel pickup sensor 60 provides a constant force between the crystals 66A and 66B and the magnetostrictive wire 48. Dimensional changes do not affect the force. The housing 62 is formed from insulating trays 64A and 64B which snap together and are secured with retaining rings 88. The pickup sensor 60 is mounted in the connector 28, as shown, with the cylindrical body formed by the semi-cylindrical body parts 70A and 70B received in the adapter 29 proximate the tube upper end 42.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. In a magnetostrictive sensing instrument for sensing position of a magnetic field, and including an elongate tube having a near end and a distal end, and a magnetostrictive wire in the tube having first and second ends, the second end being operatively secured at the tube distal end, a pickup sensor comprising:
a housing mounted proximate the tube near end, a pair of crystals in the housing, the crystals sandwiching the magnetostrictive wire so that interaction between an electrical pulse on the magnetostrictive wire and a magnetic field proximate the magnetostrictive wire produces a torsional wave on the magnetostrictive wire sensed by the pair of crystals, and a pair of spring elements mounted in the housing sandwiching the crystals to provide consistent contact force between the crystals and the magnetostrictive wire.

2. The position sensor of claim 1 wherein the spring elements comprise electrical contacts to electrically connect the crystals to a sensing circuit.

3. The position sensor of claim 2 wherein the spring elements each includes a tab extending outwardly from the housing to connect to an electrical conductor.

4. The position sensor of claim 1 wherein the housing comprises first and second trays for supporting the spring elements and the crystals and a retaining ring to maintain the plastic trays in assembled relationship.

5. The position sensor of claim 1 wherein the housing comprises first and second trays for supporting the spring elements and the crystals and a removable resilient fastener for selectively maintaining the plastic trays in assembled relationship.

6. The position sensor of claim 5 wherein the support tray, the spring elements and the crystals maintains the magnetostrictive wire in compression.

7. The position sensor of claim 1 wherein the spring elements are adhesively secured to the crystals.

8. The position sensor of claim 1 wherein the spring elements comprise electrical contacts to electrically connect the crystals to a sensing circuit and the spring elements are adhesively secured to the crystals using a conductive adhesive.

9. A magnetostrictive level sensing instrument for sensing level of a process material comprising:
an elongate tube having a near end and a distal end;
a magnet selectively positionable proximate the tube responsive to level of the process material;
a magnetostrictive wire in the tube having first and second ends, the second end being operatively secured at the tube distal end; and
a pickup sensor comprising a housing mounted proximate the tube near end, a pair of crystals in the housing, the crystals sandwiching the magnetostrictive wire so that interaction between an electrical pulse on the magnetostrictive wire and a magnetic field generated by the magnet produces a torsional wave on the magnetostrictive wire sensed by the pair of crystals, and a pair of contact blade springs mounted in the housing sandwiching the crystals to provide consistent contact force between the crystals and the magnetostrictive wire to electrically connect the crystals to a sensing circuit.

10. The magnetostrictive level sensing instrument of claim 9 wherein the blade springs each includes a tab extending outwardly from the housing to connect to an electrical conductor.

11. The magnetostrictive level sensing instrument of claim 9 wherein the housing comprises first and second trays for supporting the spring elements and the crystals and a removable resilient fastener for selectively maintaining the plastic trays in assembled relationship.

12. The magnetostrictive level sensing instrument of claim 11 wherein the removable resilient fastener comprises a retaining ring to maintain the plastic trays in assembled relationship.

13. The magnetostrictive level sensing instrument of claim 9 wherein the blade springs are adhesively secured to the crystals.

14. The magnetostrictive level sensing instrument of claim 9 wherein the spring elements are adhesively secured to the crystals using a conductive adhesive.

15. A magnetostrictive level sensing instrument for sensing level of a process material comprising:
   an elongate tube having a near end and a distal end;
   a magnet selectively positionable proximate the tube responsive to level of the process material;
   a magnetostrictive wire in the tube having first and second ends, the second end being operatively secured at the tube distal end; and
   a pickup sensor mounted proximate the tube near end comprising first and second trays each supporting a respective first and second spring element and a first and second crystal, the first and second crystals sandwiching the magnetostrictive wire so that interaction between an electrical pulse on the magnetostrictive wire and a magnetic field generated by the magnet produces a torsional wave on the magnetostrictive wire sensed by the crystals, and the spring elements sandwiching the crystals to provide consistent contact force between the crystals and the magnetostrictive wire, and removable resilient fasteners for supporting the trays and for maintaining the pickup sensor in assembled relationship devoid of any threaded fasteners.

16. The magnetostrictive level sensing instrument of claim 15 wherein the spring elements comprise electrical contacts to electrically connect the crystals to a sensing circuit and each spring elements each includes a tab extending outwardly from the housing to connect to an electrical conductor.

17. The magnetostrictive level sensing instrument of claim 15 wherein the removable resilient fasteners comprise retaining rings to maintain the plastic trays in assembled relationship.

18. The magnetostrictive level sensing instrument of claim 15 wherein the spring elements are adhesively secured to the crystals.

19. The magnetostrictive level sensing instrument of claim 15 wherein the spring elements comprise electrical contacts to electrically connect the crystals to a sensing circuit and are adhesively secured to the crystals using a conductive adhesive.

* * * * *